(12) United States Patent
Altmann (10) Patent No.: US 8,930,692 B2
(45) Date of Patent: Jan. 6, 2015

(54) MECHANISM FOR INTERNAL PROCESSING OF CONTENT THROUGH PARTIAL AUTHENTICATION ON SECONDARY CHANNEL

(75) Inventor: William Conrad Altmann, San Jose, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 1092 days.

(21) Appl. No.: 12/842,165

(22) Filed: Jul. 23, 2010

(65) Prior Publication Data

US 2012/0023331 A1 Jan. 26, 2012

(51) Int. Cl.
| | |
|---|---|
| H04L 9/32 | (2006.01) |
| H04N 21/4363 | (2011.01) |
| H04N 21/41 | (2011.01) |
| H04N 21/4367 | (2011.01) |
| H04L 29/06 | (2006.01) |

(52) U.S. Cl.
CPC ..... *H04N 21/43635* (2013.01); *H04N 21/4126* (2013.01); *H04N 21/43637* (2013.01); *H04N 21/4367* (2013.01); *H04L 63/0428* (2013.01); *H04L 63/08* (2013.01)
USPC .............................................. 713/168; 726/3

(58) Field of Classification Search
USPC ................................ 726/2; 713/168, 170, 182
See application file for complete search history.

(56) References Cited

U.S. PATENT DOCUMENTS

| | | | | |
|---|---|---|---|---|
| 7,380,118 | B2 * | 5/2008 | Kuwano et al. ................ | 713/155 |
| 7,565,698 | B2 * | 7/2009 | Isozaki et al. .................... | 726/26 |
| 7,797,536 | B1 * | 9/2010 | Lyle ............................... | 713/168 |
| 2003/0191963 | A1 | 10/2003 | Balissat et al. | |
| 2003/0226011 | A1 * | 12/2003 | Kuwano et al. ................ | 713/155 |
| 2004/0187001 | A1 * | 9/2004 | Bousis ........................... | 713/175 |
| 2005/0118987 | A1 * | 6/2005 | Isozaki et al. .............. | 455/412.1 |
| 2005/0144468 | A1 | 6/2005 | Northcutt et al. | |
| 2006/0235804 | A1 | 10/2006 | Hirata | |
| 2008/0247541 | A1 * | 10/2008 | Cholas et al. ................. | 380/200 |
| 2009/0100349 | A1 | 4/2009 | Hancock | |
| 2009/0103470 | A1 | 4/2009 | Candelore | |
| 2009/0164785 | A1 * | 6/2009 | Metke et al. ................... | 713/169 |
| 2009/0177885 | A1 * | 7/2009 | Kubota et al. ................. | 713/168 |
| 2010/0008504 | A1 * | 1/2010 | Nagara ......................... | 380/243 |
| 2010/0100724 | A1 | 4/2010 | Kaliski, Jr. | |
| 2011/0107083 | A1 * | 5/2011 | Nomura et al. ................ | 713/150 |

OTHER PUBLICATIONS

Peng Shaunghe ; Enhancing PC Security with a U-Key ; Sep.-Oct. 2006; IEE; vol. 4 , Issue: 5 ; pp. 34-39.*
"PCT/US2011/044520 International Search Report / Written Opinion", *Mailed Feb. 24, 2012*, 8 pages.
European Extended Search Report, European Application No. 11810273.0, Dec. 2, 2013, 7 pages.
PCT International Preliminary Report on Patentability, PCT Application No. PCT/US2011/044520, Jan. 31, 2013, 8 pages.

* cited by examiner

*Primary Examiner* — Mohammad W Reza
*Assistant Examiner* — Monjour Rahim
(74) *Attorney, Agent, or Firm* — Fenwick & West LLP (57) ABSTRACT

Embodiments of the invention are generally directed to performing processing of content through partial authentication of secondary channel. An embodiment of a method includes performing a first authentication between a source transmitting device and a sink receiving device for communication of data streams, and performing a second authentication between the source transmitting device and a bridge device such that the second authentication is independent of the first authentication and the sink receiving device remains uninfluenced by the second authentication. The bridge device includes an intermediate carrier device coupled to the source transmitting device and the sink receiving device. The method further includes transmitting a data stream having encrypted content from the source transmitting device to the bridge device.

17 Claims, 9 Drawing Sheets

MECHANISM FOR INTERNAL PROCESSING OF CONTENT THROUGH PARTIAL AUTHENTICATION ON SECONDARY CHANNEL

TECHNICAL FIELD

Embodiments of the invention generally relate to the field of data communications and, more particularly, to performing processing of content through partial authentication of secondary channel.

BACKGROUND

High-bandwidth Digital Content Protection (HDCP™) is utilized for digital content protection, providing for encryption of content or data transmitted over digital interfaces, including High-Definition Multimedia Interface (HDMI™) or Mobile High-Definition Link (MHL™). In today's HDCP-protected data stream, an intermediate carrier (also referred to as a "bridge" device) has to employ a complete encryption engine as well as a decryption engine to decrypt the entire data stream (that is encrypted at an upstream transmitting device, also referred to as a "source" device) to measure and process the content of the data stream and further, to re-encrypt the entire data stream before it is sent to the next downstream receiving device (also referred to as a "sink" device). In the HDCP specification, this process is referred to as "repeater". Having complete encryption and decryption engines at a bridge device is expensive, such as in terms of consuming power and die space, having to assume additional costs for having two complete key sets, requiring additional testing, and the like.

It is contemplated that various signaling protocols (e.g., Original Encryption Status Signaling (OESS), Enhanced Encryption Status Signaling (EESS)) may be used between sources and sinks for providing and detecting encrypted data streams, such as whether encryption of a data stream is enabled or disabled. For example, EESS protocol is used with the HDMI protocol (and is an optional feature in the Digital Visual Interface (DVI™) protocol), while OESS is used with the DVI protocol.

BRIEF DESCRIPTION OF THE DRAWINGS

Embodiments of the invention are illustrated by way of example, and not by way of limitation, in the figures of the accompanying drawings in which like reference numerals refer to similar elements.

SUMMARY

Embodiments of the invention are directed to performing processing of content through partial authentication of secondary channel.

In a first aspect of the invention, an embodiment of a method includes performing a first authentication between a source transmitting device and a sink receiving device for communication of data streams. The method further includes performing a second authentication between the source transmitting device and a bridge device such that the second authentication is independent of the first authentication and the sink receiving device remains uninfluenced by the second authentication. The bridge device includes an intermediate carrier device coupled to the source transmitting device and the sink receiving device. The method further includes transmitting a data stream having encrypted content from the source transmitting device to the bridge device.

In a second aspect of the invention, an embodiment of a system includes a data processing device having a storage medium and a processor coupled with the storage medium. This data processing device includes a source transmitting device which is coupled to a sink receiving device and a bridge device. This source transmitting device includes a partial authentication mechanism. The source transmitting device performs a first authentication between the source transmitting device and the sink receiving device for communication of data streams, and a second authentication between the source transmitting device and the bridge device such that the second authentication is independent of the first authentication and the sink receiving device remains uninfluenced by the second authentication. The bridge device includes an intermediate carrier device coupled to the source transmitting device and the sink receiving device. Further, the source partial authentication mechanism transmits a data stream having encrypted content from the source transmitting device to the bridge device.

In a second aspect of the invention, an embodiment of an apparatus includes a source transmitting device that includes an authentication mechanism. The source transmitting device performs a first authentication between the source transmitting device and the sink receiving device for communication of data streams, and a second authentication between the source transmitting device and the bridge device such that the second authentication is independent of the first authentication and the sink receiving device remains uninfluenced by the second authentication. The bridge device includes an intermediate carrier device coupled to the source transmitting device and the sink receiving device. Further, the source partial authentication mechanism transmits a data stream having encrypted content from the source transmitting device to the bridge device.

DETAILED DESCRIPTION

Embodiments of the invention are directed to performing partial authentication.

Embodiments of the invention are directed to performing processing of content through partial authentication of secondary channel. In one embodiment, an intermediate carrier (e.g., bridge device) of a protected data stream is allowed to access, study, and modify content of the protected data stream without requiring a complete decryption of the data stream and without the risk of revealing any of the protected content outside the integrated chip or circuit (chip) of the intermediate carrier.

It is contemplated that a number of logic/circuits may be employed at receiver, bridge and transmitter chips, such as a locking circuit, Phase Lock Loop (PLL), Delay Lock Loop (DLL), encryption logic, decryption logic, authentication engine, one or more (background/foreground) processing engines, or the like. Further, various protocols (e.g., encryption/decryption protocol, encrypted data/unencrypted data detection protocol, etc.) may include HDCP, and data signals may include HDMI or Mobile High-Definition Link (MHL) signals. It is contemplated that embodiments of the invention are not limited to HDMI and MHL and may be used for any other type of data streams. Similarly, embodiments of the invention are not limited to HDCP and can be applied to and used with other encryption protocols or mechanisms. However, HDCP, HDMI, and MHL and other similar specific references to technologies are made here for brevity, clarity, and ease of explanation.

Figure 1:
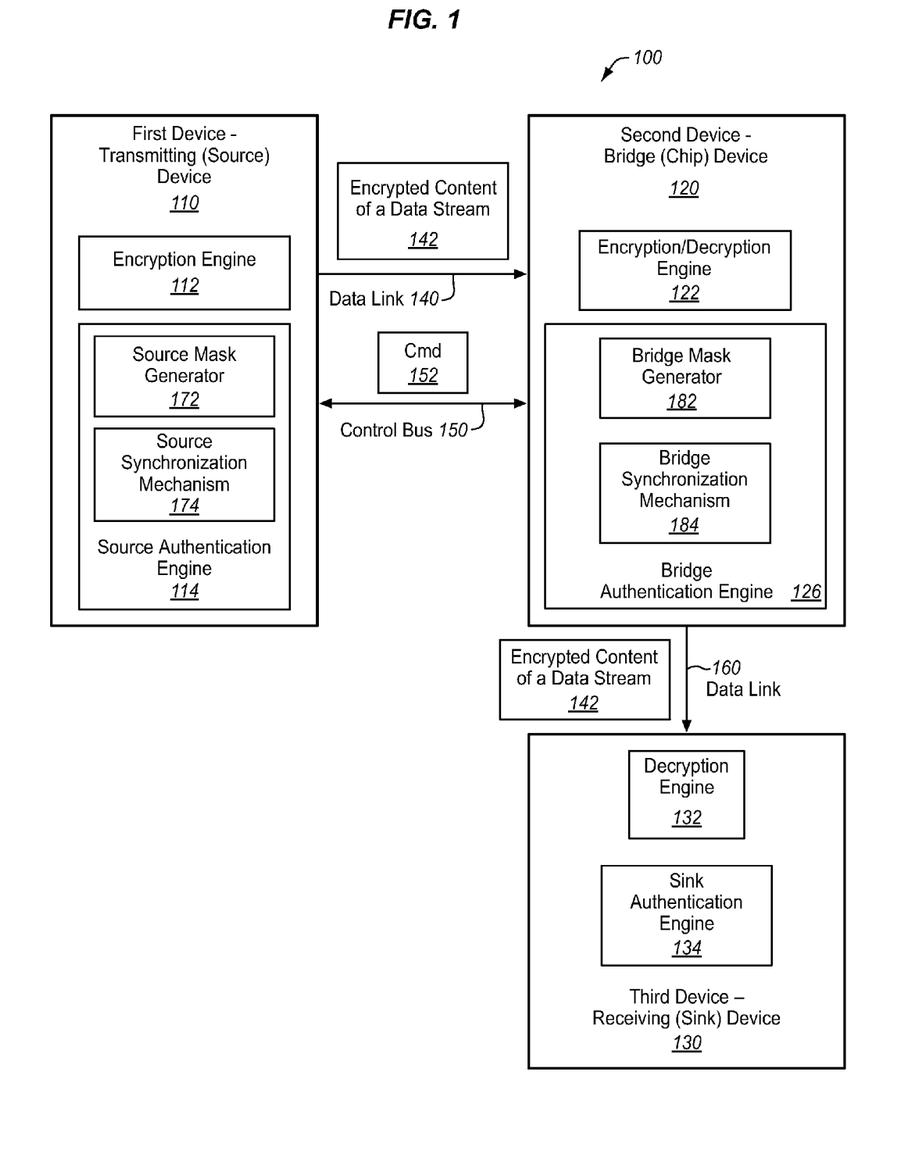
FIG. 1 illustrates a system for partial authentication according to one embodiment of the invention.

FIG. 1 illustrates a system for partial authentication according to one embodiment of the invention. The illustrated embodiment of a system 100 for partial authentication includes a first device 110 that is a source data transmitting device (also referred to as "source device", "transmitting device" or "enhanced transmitter"), a second device 120 that is an intermediate data carrier (also referred to as "bridge device" or "enhanced bridge"), and sink data receiving device 130 (also referred to as "sink device", "receiving device" and "enhanced receiver"). The source device 110 includes an encryption engine 112 to perform encryption of content of data streams, and a source authentication engine 114 to perform authentication between the source device 110 and the sink device 130 as well as the bridge device 120. The source authentication engine 114 includes a source mask generator 172 and a source synchronization mechanism 174.

The bridge device 120 includes a bridge authentication engine 126 to perform (or confirm) authentication between the bridge device 120 and the source device 110. As with the source authentication engine 114, the bridge authentication engine 126 includes a bridge mask generator 182 and a bridge synchronization mechanism 184. The bridge device 120 further includes an encryption/decryption engine 122. In one embodiment, the encryption/decryption engine 122 includes a single engine that is capable of being configured into serving as an encryption engine or a decryption engine, but at no time the bridge device 122, according to one embodiment, is required to employ both a complete encryption engine and a complete decryption engine. The sink device 130 includes a sink authentication engine 134 to perform authentication with the source device 110, and a decryption engine 132 to perform decryption of content of a data stream that is encrypted at the source device 110 or re-encrypted at the bridge device 120. In one embodiment, each of the authentication engines 114, 126, 134 includes software modules, hardware components, and any combination thereof, such as firmware having a combination of software modules and hardware components to perform various authentication processes including mask generation, calculation and communication of "secret values", maintaining authentication synchronization between devices (such as the source device 110 and the bridge device 120), and other such tasks according to embodiments of the invention.

A typical data stream contains three types of content: video content, audio content, and control content. Video content may be carried in a video data period, in which each pixel value is encrypted by a mask generated by the mask generator 172 in the source device 110. Audio content may be carried in a type of packet within a data island period, in which each data payload byte is encrypted by a mask generated by the mask generator 172 in the source device 110. Control data may be carried in different types of packets within data island periods, in which each payload byte of which is encrypted by the same type of source device-generated mask. Mask generation may proceed from clock cycle-to-clock cycle, advancing for each clock period in a video data period or a data island period. The mask generator may be "re-keyed" periodically according to the protocol in the HDCP specification.

The source device 110 transmits content of the data stream, including encrypted content 142, to the bridge device 120 via a data link 140, and the bridge device 120 to further transmit the encrypted content 142 to the sink device 130. A command bus 150 may be used to transmit commands 152 between source and bridge devices 110, 120; for example, a command is sent from the source device 110 to the bridge device 120, reading back information from the bridge device 120 that the bridge device 120 can support the source device's 110 intent to encrypt content of a data stream.

In one embodiment, a mathematical verity that a value encrypted by exclusive-OR'ing (XOR) with a pseudo-random mask value is then decrypted using the same XOR mask value is used. For example, in HDCP, the first XOR process is performed at the source device 110 and then, the second such process is performed at a sink device 130. In the conventional "repeater" process at a bridge device, although both steps are performed, the unprotected content stream is, nevertheless, exposed outside of the bridge chip, such as in between the output port of the chip of the last device and the input port of the chip of the next device. Unlike the conventional "repeater", here, in one embodiment, using the aforementioned mathematical verity, an XOR masking technique is employed at the bridge device 120 such that by using the XOR mask value at the bridge device 120, the encrypted content 142 of the data stream is decrypted at the bridge device 120 for analysis, measurement or processing, and then re-encrypted using the same XOR mask value, all within one chip and using one engine 122 (without the need to simultaneously employ a complete encryption engine and a complete decryption engine). This XOR mask value being used at the bridge device 120 is the same XOR mask value that is generated by the mask generator 172 in the original source device 110. Further, in one embodiment, synchronization mechanisms 174, 184 are employed to synchronize the XOR mask values at the source device 110 with the XOR mask values at the bridge device 120 without having the XOR mask values themselves being transmitted across the protected link (e.g., data link 140) between the source device 110 and the bridge device 120.

In one embodiment, HDCP sets up the encryption of content of the data stream (e.g., HDMI data stream, MHL data stream) at the beginning of the transmission link 140, such as at the source device 110, and then, via the source mask generator 172, creates its encryption XOR mask values clock-by-clock, as necessitated. In one embodiment, the bridge mask generator 182 at the bridge device 120 comprehends when it should advance itself in light of the rules relating to the HDCP across the transmission link 140, without having to look inside the data stream and to stay synchronized with the source device 110. For example, in case of HDCP, this may include an horizontal synchronization (HSYNC) pulse to cause horizontal re-keying, a vertical synchronization (VSYNC) pulse to cause frame (vertical) re-keying, and an OESS or EESS "CTL" pulse, to inform the next receiving device (such as the bridge device 120, the sink device 130) whether the following frame is encrypted or unencrypted. Once the source device 110 and the sink device 130 have completed the initial authentication process, the source device 110 sends the first OESS or EESS pulse, and the source device 110 and sink device 130 stay in step, clock-by-clock and frame-by-frame, indefinitely.

Since the XOR mask value created at the source device 110 for the encryption of the data stream is identical to the XOR mask value used by the sink device 130 for decryption, the bridge chip at the bridge device takes advantages of that to decrypt (and re-encrypt) the content bytes using just the XOR mask value assigned by the source device 110. In one embodiment, in case of the single engine 126 of the bridge device 120 being a decryption engine, the engine 126 is capable of being configured to be used as an encryption engine and with the encryption "secret values" of the source device 110 or reconfigured from a decrypting role to an encrypting role. However, at no time, both a decrypting engine and an encryption engine are simultaneously needed at the bridge device 120. The source device 110 contains a set of values known as secret values which it uses to initialize its XOR mask generator 172. In one embodiment, the source device 110 transfers these secret values to the bridge device 120 and by having these secret values transferred to the bridge device 120 (which includes the equivalent encryption XOR mask generator 182), the source device 110 and the bridge device 120 are made to stay synchronized without having to reveal any of the protected content or secret information (including the secret values), which are then safely transmitted to a downstream receiver, such as the sink device 130. It is contemplated that the secret values at the source device 110 may be derived, in part, from public values associated with the sink device 130.

In one embodiment, initially, the bridge device 120 plays a passive role by allowing any Display Data Channel (DDC) traffic over the data link 140 from the source device 110 to pass through to the downstream sink device 130 without interference or interruption. As aforementioned, the source device 110 and the sink device 130 perform their part of authentication (i.e., initial authentication) and upon completion of that initial authentication, the source device 110 commands the bridge device 120 to play an active role by detecting the DDC bus for HDCP traffic from the source device 110. This command between the source and bridge devices 110, 120 may be communicated through their respective authentication mechanisms 114, 126. This technique is performed, in HDMI, by allocating a new device address on the DDC bus for the bridge device 120, or by allocating new register offsets at the HDCP receiver device addresses on DDC; similarly, in MHL, this is performed on the CBUS between the source device 110 and the bridge device 120. The bridge device's 120 encryption/decryption engine 122 is used (or configured) to serve as a decryption engine, while the source device 110 performs an HDCP authentication with the bridge device 120 and establishes a trusted link across this interface between the two devices 110, 120. The source device 110 then sends the secret values calculated and communicated during the initial source-to-sink authentication to the bridge device 120 as part of a protected packet on this newly established and trusted source-to-bridge link.

Upon receiving the protected packet, the bridge device 120 may suppress the Transition Minimized Differential Signal (TMDS)-based signaling of the protected packet so that it is not exposed on the bridge device's 120 output port and so that the downstream sink device 130 does not detect anything relating to HDCP ENC_EN. Further, once the bridge device 120 receives this protected packet, the bridge device 120, via the bridge authentication engine 126, is reconfigured back to allowing the source device's 110 ENC_EN OESS or EESS pulse to pass through normally to the sink device 130 such that the source device 110 and the sink device 130 remain synchrnonized, such as in terms of normal encryption and decryption and as if the bridge device 120 did not participate in the process at all. Regarding DDC bus and CBUS, HDMI may specifically require support for an Enhanced DDC (E-DDC), which may be used by the source device 110 to determine the audio/video formats the sink device 130 supports. The CBUS refers to a mechanism for a source device or a sink device to discover connectivity to its corresponding MHL-compliant sink device and source device, respectively, and may include a single wire (one-bit), bi-directional control bus.

Given the bridge device 120 may not receive any additional encrypted content intended for its use, such as other than the encrypted content provided by the source device 110, the bridge device 120 does not need to perform a link integrity check. Further, the bridge device 120 does not encrypt any content independent of the source device's 110 own encryption and given that any decryption and re-encryption is internal to the bridge device 120 (e.g., including a chip product without the "repeater" function), there remains no necessity for the bridge device to participate in Key Selection Vector list (KSVLIST) handling, SHA-1 handling of V or V' values, or the like. Further, since the bridge device's 120 HDCP KSV (BKSV) is communicated to the source device 110, the bridge device 120 is not a repeater, such as the source device can validate the bridge device's 120 BKSV without the bridge device 120 having to support repeaters. Using the source device's 110 secret values, the bridge device 120 may prepare to receive encrypted content 142 from the source device 110, while watching for OESS, EESS, HSYNC and VSYNC pulses, and the falling edge of video data periods to maintain its HDCP engine's synchronization with the source device 110.

In one embodiment, when the bridge device 120 detects (such as arriving at the bridge device's 120 input port) the first OESS or EESS pulse in the data stream authenticated for the downstream sink device 130, it triggers its own mask generator 182. Using, for example, A XOR B XOR B=A, the bridge device 120 re-generates the original 'A' value using the 'B' mask identical to the B mask at the source device 110. At this point, the bridge device 120 is capable of performing any number of functions, such as (1) reporting the content of data island periods. This, for example, can be the information in an AVI InfoFrame, or in a gamut metadata packet. Access to this information allows the bridge device 120 to track the mode of the link 140 with the source device 110; (2) monitor the timings of HSYNC and VSYNC for any variation, such as an inline indicator of mode change or mode interruption. VSYNC and HSYNC may be inside a data island period and therefore, encrypted and remain invisible to the bridge device 120 unless the relevant data island periods are decrypted; (3) convert an incoming MHL PackedPixel stream to an HDCP-compliant HDMI output stream; (4) perform color-space conversion on video data, such as RGB-to-YCbCr, YCbCr444-to-YCbCr422, or even 8-bit YCbCr422 to 10-bit or 12-bit YCbCr422; (5) mute the audio, while leaving the number and timing of audio data packets unaffected; (6) blank the video content by over-writing the content pixel values with fixed data or data without the original content included; and (7) fix front-porch or back-porch horizontal timings with a suitable line buffer.

In one embodiment, if the bridge device 120 does not modify the content bytes or data island bytes, it does not need to re-encrypt the content, and the originally encrypted data stream 142 (received from the source device 110) can flow through the bridge device 120 onto the sink device 130, even as the bridge device 120 samples content of the encrypted data stream 142. This technique is useful, for example, in testing equipment such as a protocol analyzer or a "bus monitor" to examine the content or data island periods on an HDCP link, without having to allow access to the protected content of the data stream outside the bridge chip of the bridge device 120. If, however, in one embodiment, the bridge device 120 modifies any of the contente (such as data island periods or content bytes) of the encrypted data stream 142 it received from the source device 110, without adding or subtracting bytes from the data stream (and keeping the encrypted byte count per line and per field unchanged), then the bridge device 120 re-encrypts the modified content of the data stream using the same XOR mask value as determined by the source device 110.

Figure 2:
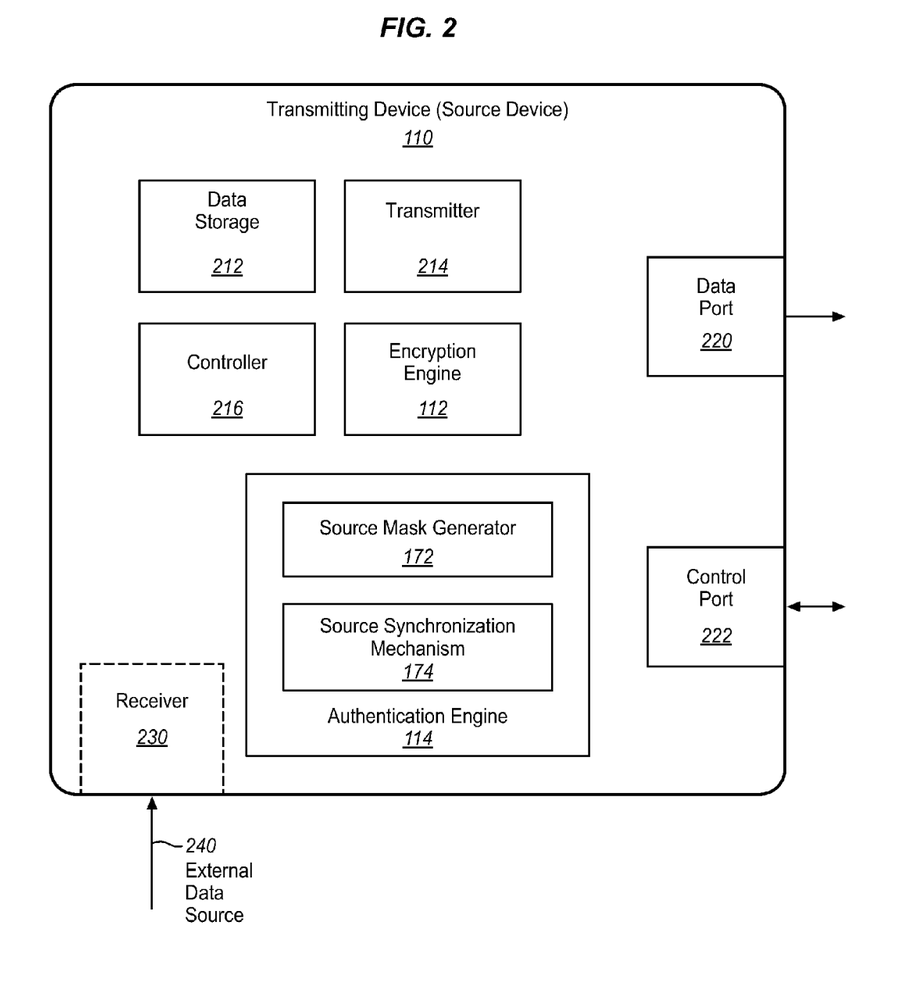
FIG. 2 illustrates a source transmitting device according to one embodiment of the invention.

FIG. 2 illustrates a source transmitting device according to one embodiment of the invention. In some embodiments, a source device 110 includes a transmitter 214 for the transmission of data streams, a controller 216 to control data transmission, and an encryption engine 218 to encrypt content of the data stream (as shown in FIG. 1) prior to transmission to another device (e.g., a receiving device, such as a bridge device or a sink device). The source device 110 may further include data storage 212 for storage of data prior to transmission, and a receiver 230 to receive certain data from an external data source 240 prior to transmission.

In one embodiment, the source transmitting device 110 includes a source authentication engine 114 to perform authentication with a downstream receiving device, such as a sink device, or partial authentication with an intermediate carrier, such as a bridge device. The source authentication engine 114 may work with other authentication engines, such as the ones at the bridge and sink devices, to perform authentication or partial authentication processes as may be the case. The source authentication engine 114 further includes a source mask generator 172 to create or generate XOR mask values, and a source synchronization mechanism 174 to maintain authentication synchronization between the source device 110 and bridge and sink devices.

Figure 3A:
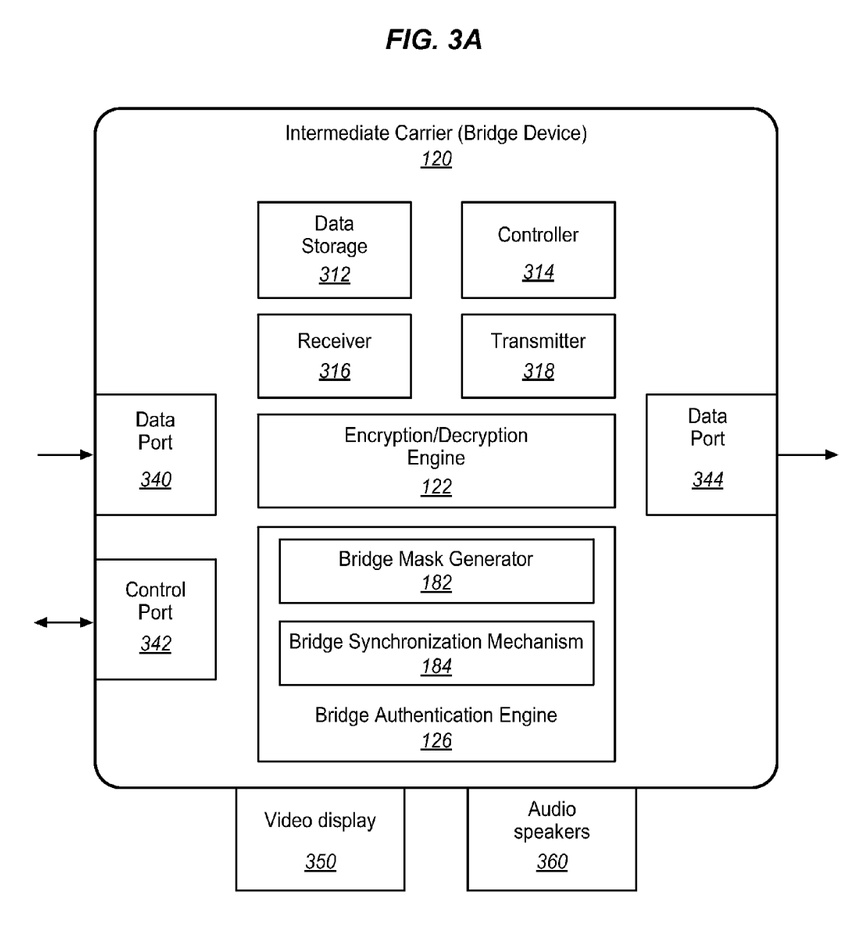
FIG. 3A illustrates a bridge device according to one embodiment of the invention.

FIG. 3A illustrates a bridge device according to one embodiment of the invention. A bridge device 120 serves as an intermediary carrier where a data stream is received from the source device and, in some embodiments, contents of the data stream is accessed, analyzed and even modified at the bridge device before the data stream is transmitted to a sink device. In case of modification of the content at the bridge device, the modified content is re-encrypted at the bridge device before it is transmitted to the sink device.

In one embodiment, the bridge device 120 includes a bridge authentication engine 134 which further includes a source mask generator 182 and a sink synchronization engine 184 to communicate authentication process with a source device such that a source-bridge link is established between the two devices without having the involvement of or influencing a downstream sink device. The source-bridge link is used for a separate authentication process (such as partial authentication) between a source device and the bridge device 120. The bridge device 120 further includes a single engine 122 which, in one embodiment, can be configured to serve as an encryption engine or a decryption engine as necessitated.

Figure 3B:
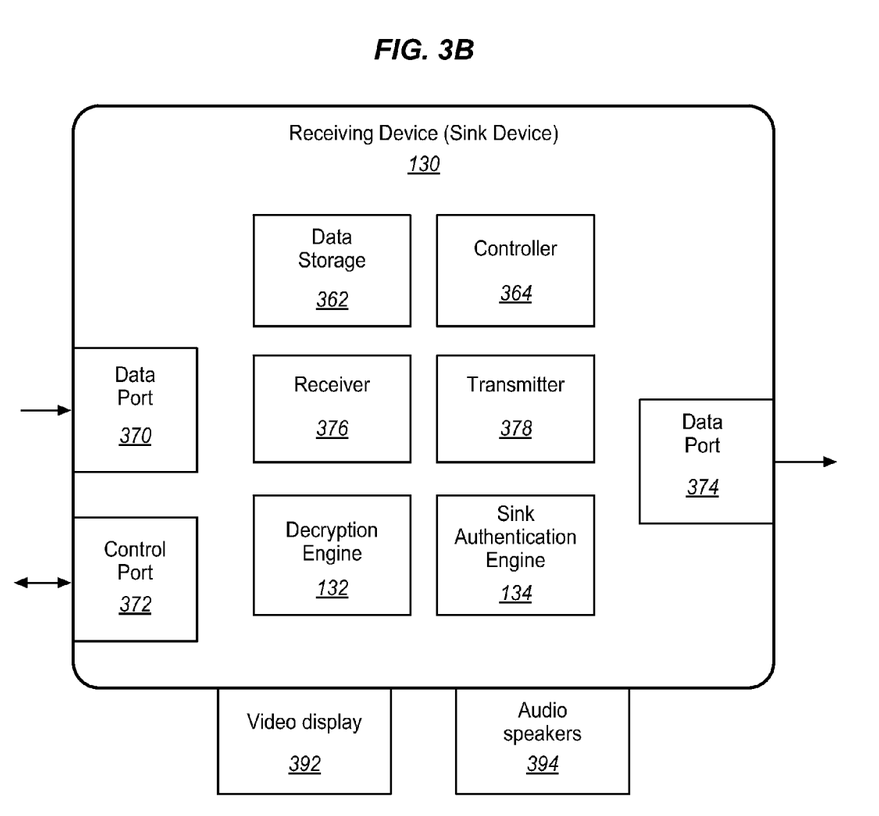
FIG. 3B illustrates a sink receiving device according to one embodiment of the invention.

FIG. 3B illustrates a sink receiving device according to one embodiment of the invention. A sink device 130 includes a downstream receiving device to receive a data stream from a source device and, in some cases, via a bridge device. The sink device 130 includes a sink authentication engine 134 to communicate with a source authentication engine at a source device to perform an initial authentication of the source and sink devices so that the sink device 130 can receive data stream from the source device. This initial authentication is performed prior to the (partial) authentication between the source device and a bridge device. The sink device 130 further includes a decryption engine 132 to decrypt the encrypted content of data streams received from the source device (and through a bridge device).

Figure 4:
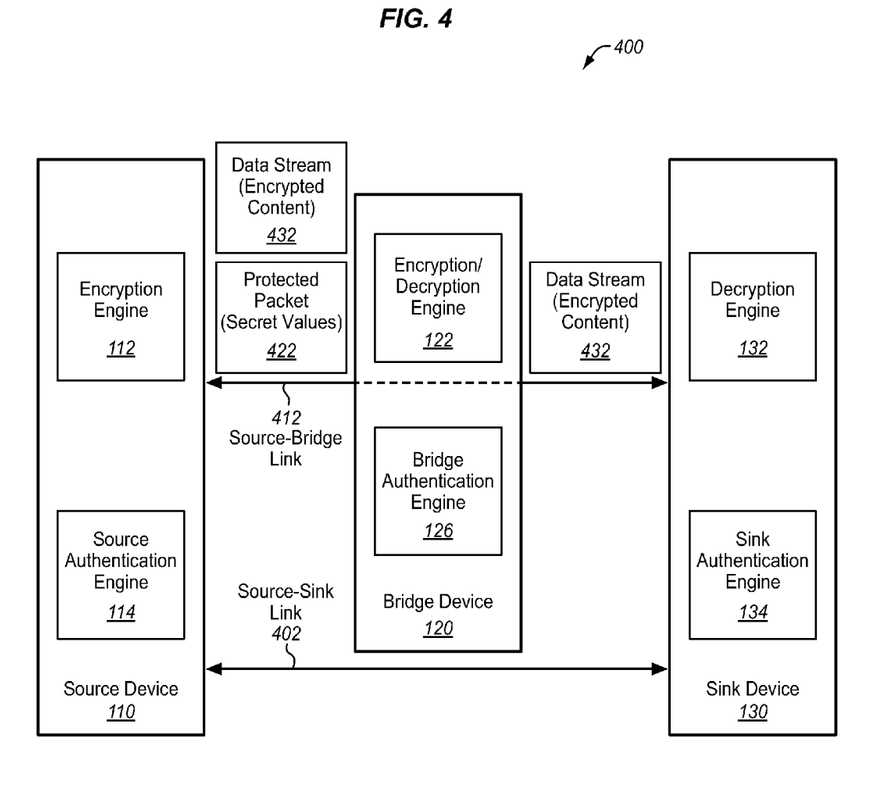
FIG. 4 illustrates partial authentication according to one embodiment of the invention.

FIG. 4 illustrates partial authentication according to one embodiment of the invention. An unencrypted data stream is received at a source device 110. Using the source and sink authentication engines 114, 134, authentication between the source device 110 and a sink device 130 is performed over a source-sink link 402. Using this initial authentication between the source and sink devices 110, 130 and the public values associated with the sink device 130, secret values are calculated and saved by the source device 110 using the source authentication engine 114. The source-sink link 402 is then switched to a source-bridge link 412 by having the source device 110 write a register in a bridge chip of the bridge device 120 across DDC (in case of HDMI) or send a command on CBUS (in case of MHL) and thus, source-bridge authentication is performed. On the bridge side, the DDC data (in case of HDMI) or CBUS command (in case of MHL) requesting the change to perform the source-bridge authentication is recognized and then, authentication is performed with the source device 110. Prior to source-bridge authentication, the bridge device 120 is initialized in mode to all DDC (HDMI) from the source device 110 to the sink device 130.

Upon establishing authentication between the source device 110 and the bridge device 120, encryption of a data stream 432 is started, using the encryption engine 112, and indicated by, for example, normal OESS or EESS means. The saved secret values are then sent from the source device 110 to the bridge device 120 in an encrypted stream, such as in a data stream 432 or in a protected package 422 separate from the data stream 432. The secret values are received and decrypted at the bridge device 120, and this receipt of the secret values at the bridge device 120 is confirmed by the source device 110 by reading a DDC address (in case of HDMI) or having the bridge device 120 send a CBUS command (in case of MHL). The source-bridge link 412 is then switched back to the source-sink link 402 by having the source device 110 write register in the bridge chip across DDC (in case of HDMI) or sending a CBUS command (in case of MHL). Encryption of the data stream is performed using the source encryption engine 112 to be communicated to the sink device 130 as is indicated by normal OESS and ESS means. An HDCP link 402 between the source device 110 and the sink device 130 is maintained, while monitoring the data stream being sent from the source device, and decrypting content of the data stream, when necessary. The data stream 432 is eventually transmitted to the sink device 130. This data stream 432 may be the same data stream as the one originally encrypted at and transmitted from the source device or it may include some modifications made (and re-encrypted using the encryption/decryption engine 122) at the bridge device 120.

Figure 5:
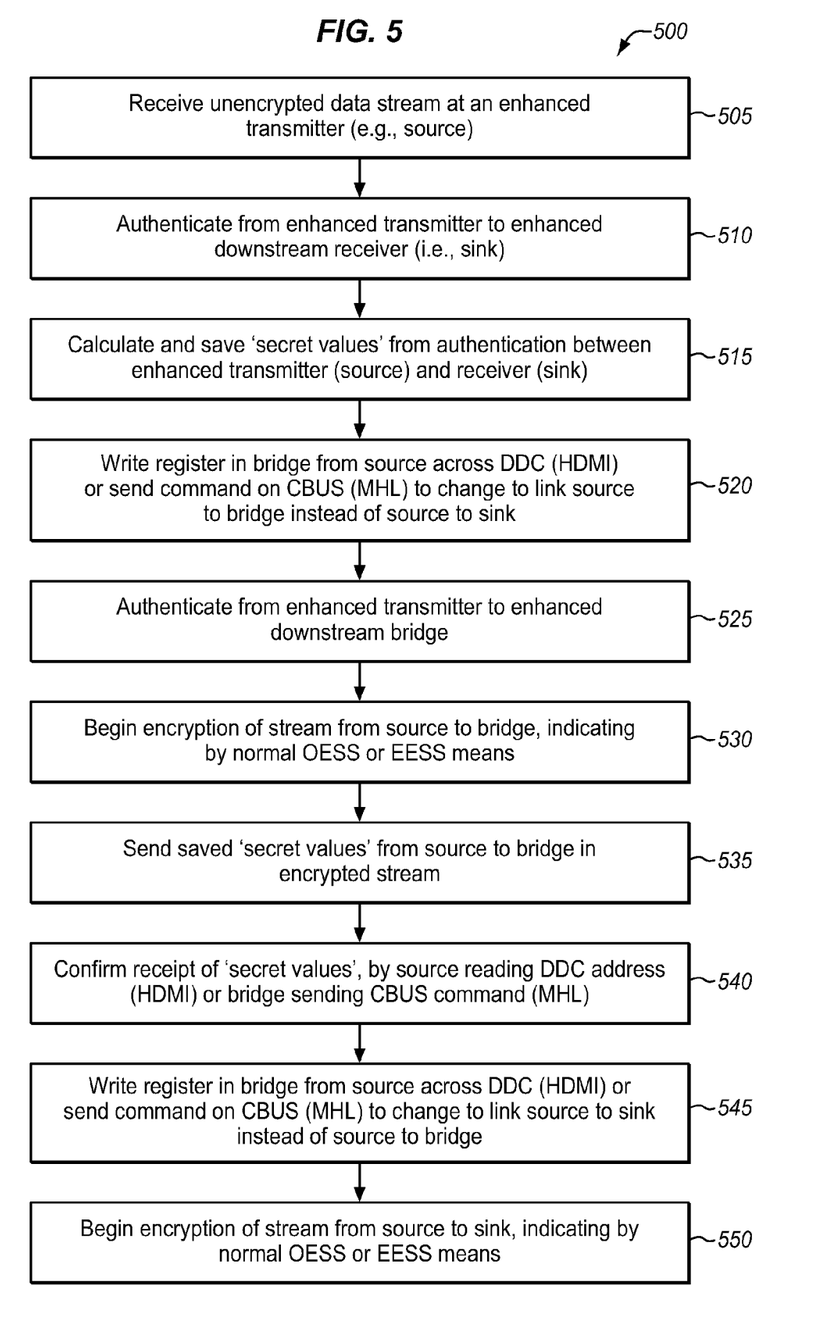
FIG. 5 illustrates a method for performing partial authentication involving a source transmitting device according to one embodiment of the invention.

FIG. 5 illustrates a method for performing partial authentication according to one embodiment of the invention. Method 500 may be performed by processing logic that may comprise hardware (e.g., circuitry, dedicated logic, programmable logic, microcode, etc.), software (such as instructions run on a processing device), or a combination thereof, such as firmware or functional circuitry within hardware devices as described with reference to FIG. 1.

At block 505, an unencrypted data stream is received at a source device. Using the source and sink authentication engines, a sink device is authenticated from the source device at block 510. Using this initial source-sink authentication and the public values associated with the sink device, secret values are calculated and saved by the source device using the source authentication engine at processing block 515. The source-sink link is then switched to a source-bridge link by having the source device write register in a bridge chip of the bridge device across DDC (in case of HDMI) or send a command on CBUS (in case of MHL) at processing block 520 and thus, source-bridge authentication is performed at processing block 525.

At processing block 530, upon establishing authentication between the source device and the bridge device, encryption of the data stream is started as indicated by, for example, normal OESS or EESS means. At processing block 535, the saved secret values are then sent from the source device to the bridge device in an encrypted data stream or within a protected package separate from the data stream. The secret values are received and decrypted at the bridge device, and this receipt of the secret values at the bridge device is confirmed by the source device by reading a DDC address (in case of HDMI) or having the bridge device send a CBUS command (in case of MHL) at processing block 540. The source-bridge link is then switched back to the source-sink link by having the source device write register in the bridge chip across DDC (in case of HDMI) or sending a CBUS command (in case of MHL) at processing block 545. As aforementioned, encryption of the data stream from the source device to the sink device begins as indicated by normal OESS and ESS means at processing block 550.

Figure 6:
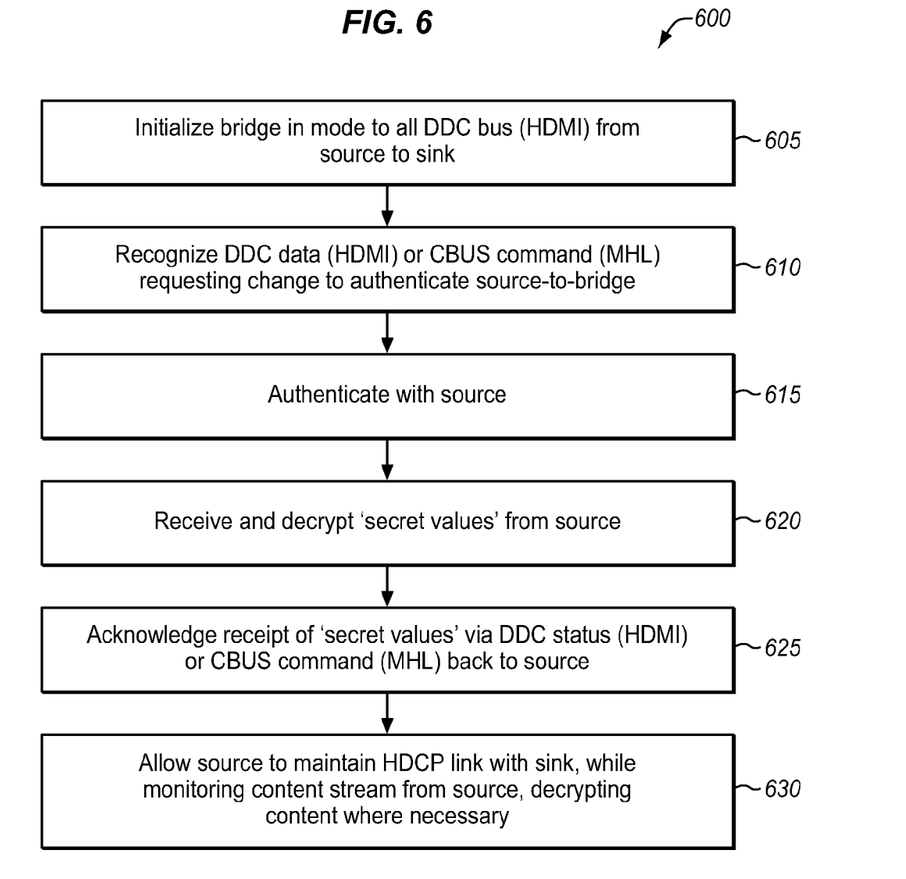
FIG. 6 illustrates a method for performing partial authentication involving a bridge device according to one embodiment of the invention.

FIG. 6 illustrates a method for performing partial authentication according to one embodiment of the invention. Method 600 may be performed by processing logic that may comprise hardware (e.g., circuitry, dedicated logic, programmable logic, microcode, etc.), software (such as instructions run on a processing device), or a combination thereof, such as firmware or functional circuitry within hardware devices as described with reference to FIG. 1.

At processing block 605, a bridge device is initialized in mode to all DDC bus (in case of HDMI) from a source device to a downstream sink device. At processing block 610, DDC data (for HDMI) or a CBUS command (for MHL) requesting change to authenticate source-to-bridge is recognized. At processing block 615, authentication of the bridge device is performed with the source device. At processing block 620, secret values are received from the source device and decrypted at the bridge device. The receipt of the secret values at the bridge device is acknowledged via DDC status (for HDMI) and CBUS command (for MHL) being sent back to the source device so the source device becomes aware of the secret values being received at the bridge device at processing block 625. At processing block 630, the source device is allowed to maintain HDCP link with the sink device, while monitoring the data stream from the source device, and decrypting the encrypted content, as necessary.

Figure 7:
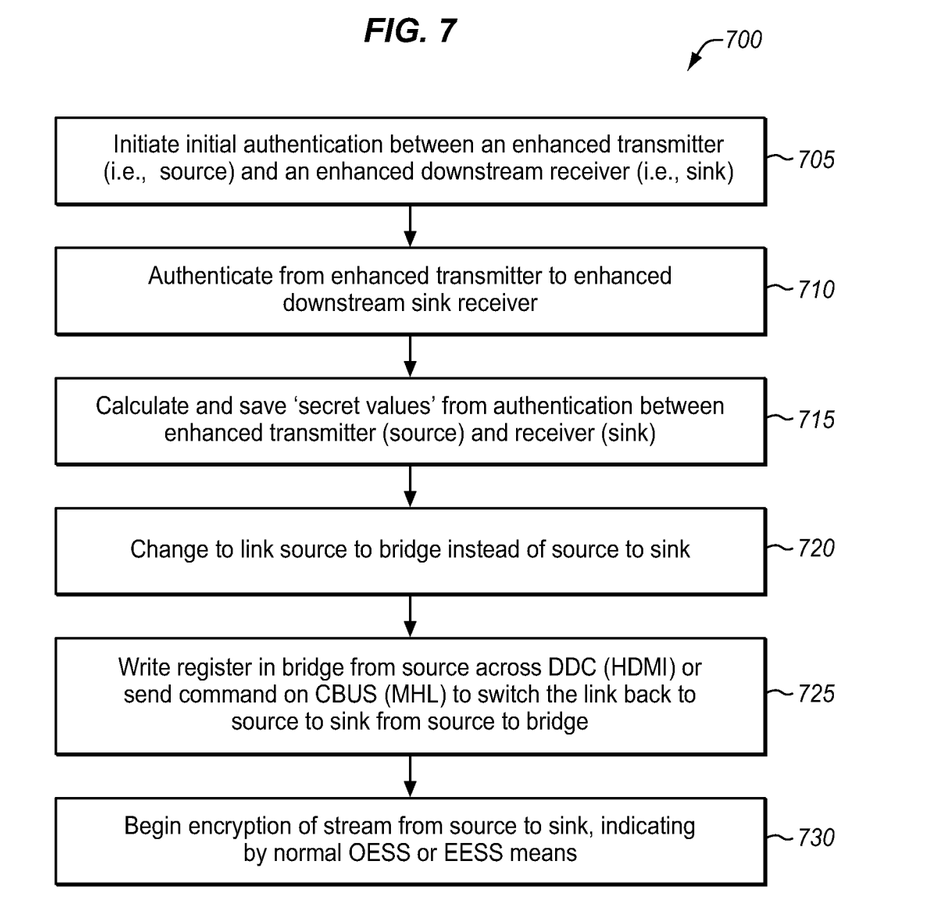
FIG. 7 illustrates a method for performing partial authentication involving a sink receiving device according to one embodiment of the invention.

FIG. 7 illustrates a method for performing partial authentication involving a sink receiving device according to one embodiment of the invention. Method 700 may be performed by processing logic that may comprise hardware (e.g., circuitry, dedicated logic, programmable logic, microcode, etc.), software (such as instructions run on a processing device), or a combination thereof, such as firmware or functional circuitry within hardware devices as described with reference to FIG. 1.

At block 705, an initial authentication process is initiated between an enhanced source transmitting device and a downstream enhanced sink receiving device. At block 710, using the source and sink authentication engines, initial authentication between a source device and a sink device is performed. Using this initial source-sink authentication and the public values associated with the sink device, secret values are calculated and saved by the source device using the source authentication engine at block 715. In one embodiment, at block 720, this source-sink link may then be switched to a source a source-bridge link for a source-bridge authentication as described with reference to FIGS. 5 and 6.

At processing block 725, the source-bridge link is then switched back to the source-sink link by having the source device write register in the bridge chip across DDC (in case of HDMI) or sending a CBUS command (in case of MHL). As aforementioned, encryption of the data stream to the sink device, from the source device, begins as indicated by normal OESS and ESS means at processing block 730. At block 735, the encrypted stream received from the source transmitting device is decrypted at the sink receiving device.

Figure 8:
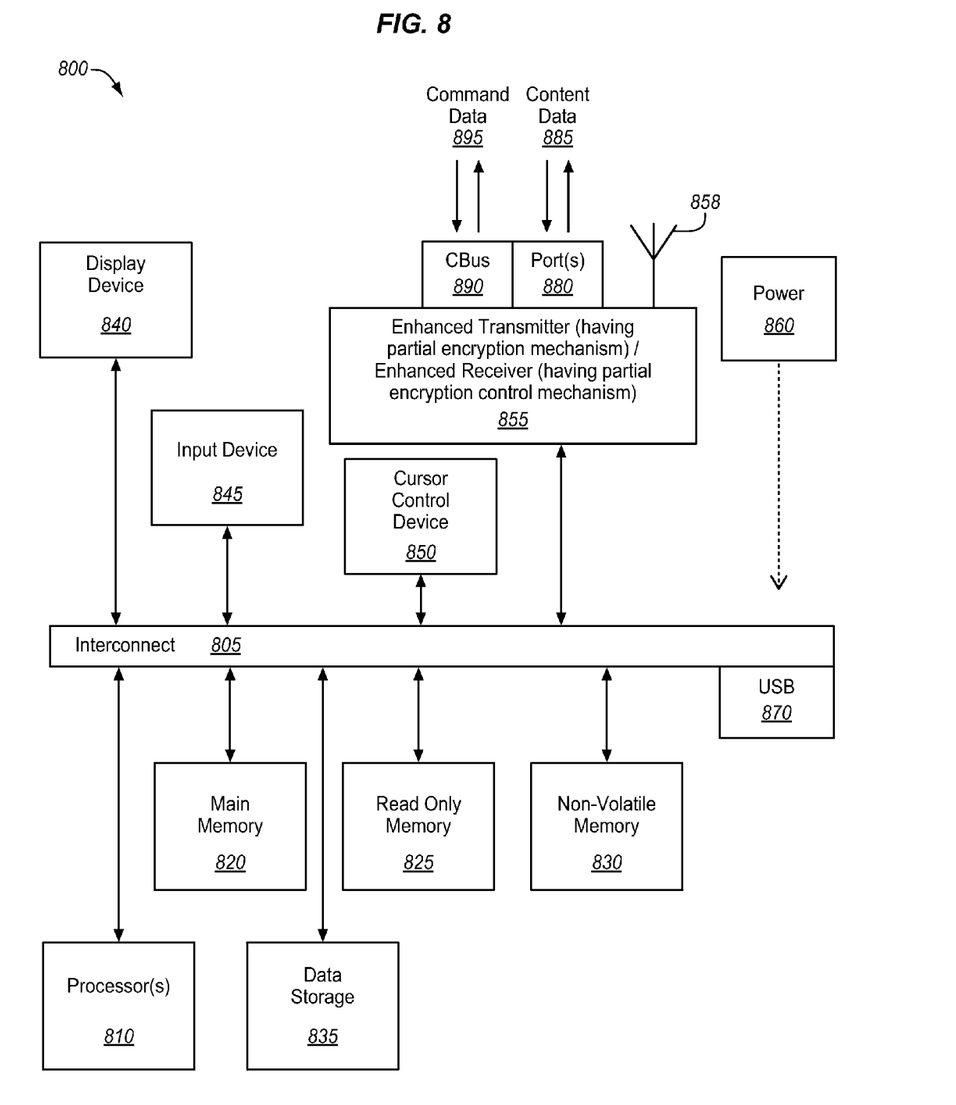
FIG. 8 illustrates elements of a system capable of employing embodiments of the present invention.

FIG. 8 illustrates a system for employing transmitters and receivers having authentication mechanisms of FIG. 1 according to one embodiment of the invention. In this illustration, certain standard and well known components that are not germane to the present description are not shown. Under some embodiments, a device 800 may be a transmitting device, a receiving device, or both.

Under some embodiments, the device 800 comprises an interconnect or crossbar 805 or other communication means for transmission of data. The data may include audio-visual data and related control data. The device 800 may include a processing means such as one or more processors 810 coupled with the interconnect 805 for processing information. The processors 810 may comprise one or more physical processors and one or more logical processors. Further, each of the processors 810 may include multiple processor cores. The interconnect 805 is illustrated as a single interconnect for simplicity, but may represent multiple different interconnects or buses and the component connections to such interconnects may vary. The interconnect 805 shown here is an abstraction that represents any one or more separate physical buses, point-to-point connections, or both connected by appropriate bridges, adapters, or controllers. The interconnect 805 may include, for example, a system bus, a PCI or PCIe bus, a HyperTransport or industry standard architecture (ISA) bus, a small computer system interface (SCSI) bus, a IIC (I2C) bus, or an Institute of Electrical and Electronics Engineers (IEEE) standard 1394 bus, sometimes referred to as "Firewire". ("Standard for a High Performance Serial Bus" 1394-1995, IEEE, published Aug. 30, 1996, and supplements) The device 800 further may include a serial bus, such as Universal Serial Bus (USB) 870, to which may be attached one or more USB compatible connections.

In some embodiments, the device 800 further comprises a random access memory (RAM) or other dynamic storage device as a main memory 820 for storing information and instructions to be executed by the processors 810. Main memory 820 also may be used for storing temporary variables or other intermediate information during execution of instructions by the processors 810. RAM memory includes dynamic random access memory (DRAM), which requires refreshing of memory contents, and static random access memory (SRAM), which does not require refreshing contents, but at increased cost. DRAM memory may include synchronous dynamic random access memory (SDRAM), which includes a clock signal to control signals, and extended data-out dynamic random access memory (EDO DRAM). In some embodiments, memory of the system may certain registers or other special purpose memory. The device 800 also may comprise a read only memory (ROM) 825 or other static storage device for storing static information and instructions for the processors 810. The device 800 may include one or more non-volatile memory elements 830 for the storage of certain elements.

Data storage 835 may also be coupled to the interconnect 805 of the device 800 for storing information and instructions. The data storage 835 may include a magnetic disk, an optical disc and its corresponding drive, or other memory device. Such elements may be combined together or may be separate components, and utilize parts of other elements of the device 800.

The device 800 may also be coupled via the interconnect 805 to a display or presentation device 840. In some embodiments, the display may include a liquid crystal display (LCD), a plasma display, a cathode ray tube (CRT) display, or any other display technology, for displaying information or content to an end user. In some embodiments, the display 840 may be utilized to display television programming. In some environments, the display 840 may include a touch-screen that is also utilized as at least a part of an input device. In some environments, the display 840 may be or may include an audio device, such as a speaker for providing audio information, including the audio portion of a television program. An input device 845 may be coupled to the interconnect 805 for communicating information and/or command selections to the processors 810. In various implementations, the input device 845 may be a keyboard, a keypad, a touch screen and stylus, a voice activated system, or other input device, or combinations of such devices. Another type of user input device that may be included is a cursor control device 850, such as a mouse, a trackball, or cursor direction keys for communicating direction information and command selections to the one or more processors 810 and for controlling cursor movement on the display 840.

One or more transmitters or receivers 855 may also be coupled to the interconnect 805. In one embodiment, an enhanced transmitter 855 includes a source device employing a partial authentication mechanism having a source authentication engine, while an enhanced receiver 855 includes a bridge device employing a partial encryption mechanism having a bridge authentication mechanism, and a sink device employing a partial encryption mechanism having a sink authentication mechanism as described with reference to FIG. 1. In some embodiments the device 800 may include one or more ports 880 for the reception or transmission of data. Data that may be received or transmitted may include video data or audio-video data, such as HDMI data, and may be encrypted, such as HDCP encrypted data. In some embodiments, the device 800 is a receiving device, and operates to select a port for the reception of data, while sampling data from one or more other ports to determine whether the data received at the ports that have not been selected for foreground processing is encrypted. The device 800 may further include one or more antennas 858 for the reception of data via radio signals. The device 800 may also comprise a power device or system 860, which may comprise a power supply, a battery, a solar cell, a fuel cell, or other system or device for providing or generating power. The power provided by the power device or system 860 may be distributed as required to elements of the device 800.

In the description above, for the purposes of explanation, numerous specific details are set forth in order to provide a thorough understanding of the present invention. It will be apparent, however, to one skilled in the art that the present invention may be practiced without some of these specific details. In other instances, well known structures and devices are shown in block diagram form. There may be intermediate structure between illustrated components. The components described or illustrated herein may have additional inputs or outputs which are not illustrated or described. The illustrated elements or components may also be arranged in different arrangements or orders, including the reordering of any fields or the modification of field sizes.

The present invention may include various processes. The processes of the present invention may be performed by hardware components or may be embodied in computer-readable instructions, which may be used to cause a general purpose or special purpose processor or logic circuits programmed with the instructions to perform the processes. Alternatively, the processes may be performed by a combination of hardware and software.

Portions of the present invention may be provided as a computer program product, which may include a computer-readable medium having stored thereon computer program instructions, which may be used to program a computer (or other electronic devices) to perform a process according to the present invention. The computer-readable medium may include, but is not limited to, floppy diskettes, optical disks, compact disk ROM (CD-ROM), magneto-optical disks, ROM, RAM, erasable programmable ROM (EPROM), electrically-erasable programmable ROM (EEPROM), magnet or optical cards, flash memory, or other type of media/computer-readable medium suitable for storing electronic instructions. Moreover, the present invention may also be downloaded as a computer program product, wherein the program may be transferred from a remote computer to a requesting computer.

Many of the methods are described in their most basic form, but processes may be added to or deleted from any of the methods and information may be added or subtracted from any of the described messages without departing from the basic scope of the present invention. It will be apparent to those skilled in the art that many further modifications and adaptations may be made. The particular embodiments are not provided to limit the invention but to illustrate it.

If it is said that an element "A" is coupled to or with element "B," element A may be directly coupled to element B or be indirectly coupled through, for example, element C. When the specification states that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification refers to "a" or "an" element, this does not mean there is only one of the described elements.

An embodiment is an implementation or example of the invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects.

What is claimed is:

1. A method comprising:
performing a first authentication between a source transmitting device and a sink receiving device for communication of data streams, the first authentication comprising generation of secret values at the source transmitting device using a public value associated with the sink receiving device;
performing a second authentication between the source transmitting device and a bridge device between the source transmitting device and the sink receiving device, the second authentication comprising:
sending the secret values from the source transmitting device to the bridge device,
receiving a confirmation at the source transmitting device from the bridge device indicating that the secret values have been received at the bridge device, and
triggering the transmission of the data stream to the bridge device after receiving the confirmation;
receiving a data stream having encrypted content from the source transmitting device, the encrypted content generated at the source transmitting device using the secret values the encrypted content;
at least partially decrypting the encrypted content at the bridge device;
processing the at least partially decrypted content at the bridge device;
responsive to processing the at least partially encrypted content, re-encrypting the processed content using the secret values at the bridge device; and
transmitting the re-encrypted content to the sink receiving device for decrypting at the sink receiving device using the secret values.

2. The method of claim 1, further comprising decrypting the secret values at the bridge device.

3. The method of claim 1, wherein the first authentication is performed on a first link between the source transmitting device and the sink receiving device, and wherein the second authentication is performed on a second link between the source transmitting device and the bridge device.

4. The method of claim 1, wherein the content comprises High-Definition Multimedia Interface (HDMI)-based content or Mobile High-Definition Link (MHL)-based content.

5. The method of claim 1, wherein the encryption of the content is based on a High-bandwidth Digital Content Protection (HDCP) protocol.

6. A source transmitting device comprising:
a processor; and
an authentication mechanism configured to:
perform a first authentication with a sink receiving device for communication of data streams by at least generating secret values using a public value associated with the sink receiving device;
perform a second authentication with a bridge device by:
sending the secret values to the bridge device,
receiving a confirmation at the source transmitting device from the bridge device indicating that the secret values have been received at the bridge device, and
triggering the transmission of the data stream to the bridge device upon receiving the confirmation; and
transmit a data stream having encrypted content to the bridge device, the encrypted content at least partially decrypted, processed and re-encrypted at the bridge device using the secret values.

7. The source transmitting device of claim 6, wherein the bridge device is configured to receive and decrypt the secret values.

8. The method of claim 1, wherein the at least partially decrypting the encrypted content comprises XOR processing the encrypted content with the secret values.

9. The method of claim 3, wherein the secret values are transmitted over the second link but not over the first link.

10. The method of claim 1, wherein the second authentication further comprises allocating a device address or register offsets for the bridge device.

11. The source transmitting device of claim 6, wherein the at least partial decryption and the re-encryption are performed at the at the bridge device by XOR processing.

12. The source transmitting device of claim 6, wherein the first authentication is performed on a first link between the source transmitting device and the sink receiving device, and wherein the second authentication is performed on a second link between the source transmitting device and the bridge device.

13. The source transmitting device of claim 12, wherein the secret values are transmitted over the second link but not over the first link.

14. The source transmitting device of claim 6, wherein the second authentication is performed further by allocating a device address or register offsets for the bridge device.

15. A non-transitory computer-readable storage medium storing instructions thereon, the instructions when executed by a processor causing the processor to:
perform a first authentication with a sink receiving device for communication of data streams by at least generating secret values using a public value associated with the sink receiving device;
perform a second authentication with a bridge device by:
sending the secret values to the bridge device,
receiving a confirmation at the source transmitting device from the bridge device indicating that the secret values have been received at the bridge device, and
triggering the transmission of the data stream to the bridge device upon receiving the confirmation; and
transmit a data stream having encrypted content to the bridge device, the encrypted content at least partially decrypted, processed and re-encrypted at the bridge device using the secret values.

16. The computer-readable storage medium of claim 15, wherein the first authentication comprise is performed on a first link between the source transmitting device and the sink receiving device, and wherein the second authentication is performed on a second link between the source transmitting device and the bridge device.

17. The computer-readable storage medium of claim 15, wherein the secret values are transmitted over the second link but not over the first link.

* * * * *